United States Patent
Bak (10) Patent No.: US 9,552,632 B2
(45) Date of Patent: Jan. 24, 2017

(54) DYNAMIC WAVEFORM REGION ENHANCEMENT

(71) Applicant: Siemens Medical Solutions USA, Inc., Malvern, PA (US)

(72) Inventor: Donald J. Bak, Streamwood, IL (US)

(73) Assignee: SIEMENS MEDICAL SOLUTIONS USA, INC., Malvern, PA (US)

( * ) Notice: Subject to any disclaimer, the term of this patent is extended or adjusted under 35 U.S.C. 154(b) by 0 days.

(21) Appl. No.: 14/941,415

(22) Filed: Nov. 13, 2015

(65) Prior Publication Data

US 2016/0071254 A1    Mar. 10, 2016

Related U.S. Application Data

(63) Continuation of application No. 14/133,776, filed on Dec. 19, 2013, now Pat. No. 9,262,816, which is a continuation-in-part of application No. 14/050,402, filed on Oct. 10, 2013, now abandoned.

(60) Provisional application No. 61/711,862, filed on Oct. 10, 2012, provisional application No. 61/711,859, filed on Oct. 10, 2012.

(51) Int. Cl.
| | |
|---|---|
| *G06T 5/30* | (2006.01) |
| *G06T 5/00* | (2006.01) |
| *G06T 3/40* | (2006.01) |
| *G06T 7/00* | (2006.01) |

(52) U.S. Cl.
CPC . *G06T 5/30* (2013.01); *G06T 3/40* (2013.01); *G06T 5/005* (2013.01); *G06T 7/0081* (2013.01); *G06T 7/0085* (2013.01); *G06T 2207/10024* (2013.01); *G06T 2207/20036* (2013.01)

(58) Field of Classification Search
CPC ....................................................... G06T 5/30
See application file for complete search history.

(56) References Cited

U.S. PATENT DOCUMENTS

| | | | | |
|---|---|---|---|---|
| 2002/0131646 | A1* | 9/2002 | Fujimoto | G06K 9/38 382/266 |
| 2009/0040234 | A1* | 2/2009 | Kobayashi | G09G 5/02 345/604 |
| 2009/0196524 | A1* | 8/2009 | Godin | G06T 5/004 382/263 |

* cited by examiner

*Primary Examiner* — Edward Martello (57) ABSTRACT

A system and method includes reception of a color image comprising a plurality of color pixels, conversion of the color image to a monochromatic image comprising a plurality of monochromatic pixels, performance of M erosion operations on the monochromatic image to generate an eroded monochromatic image, where M is equal to or greater than one, performance of N dilation operations on the eroded monochromatic image to generate a mask image, where N is equal to or greater than one, identification of one or more regions of the mask image based on the mask image, and modification of regions of the color image corresponding to the identified regions of the mask image.

20 Claims, 8 Drawing Sheets

DYNAMIC WAVEFORM REGION ENHANCEMENT

CROSS REFERENCE TO RELATED APPLICATIONS

This application is a Continuation Application of U.S. patent application Ser. No. 14/133,776, filed Dec. 19, 2013 and also claims benefit to and priority of U.S. patent application Ser. No. 14/050,402, filed Oct. 10, 2013, U.S. Provisional Patent Application Ser. No. 61/711,862, filed Oct. 10, 2012, and U.S. Provisional Patent Application Ser. No. 61/711,859, filed Oct. 10, 2012, the contents of which are hereby incorporated by reference in their entirety for all purposes.

BACKGROUND

Field

The embodiments described below relate to image signal processing and, more specifically, to efficient detection and/or enhancement of certain image regions.

Description

Figure 1:
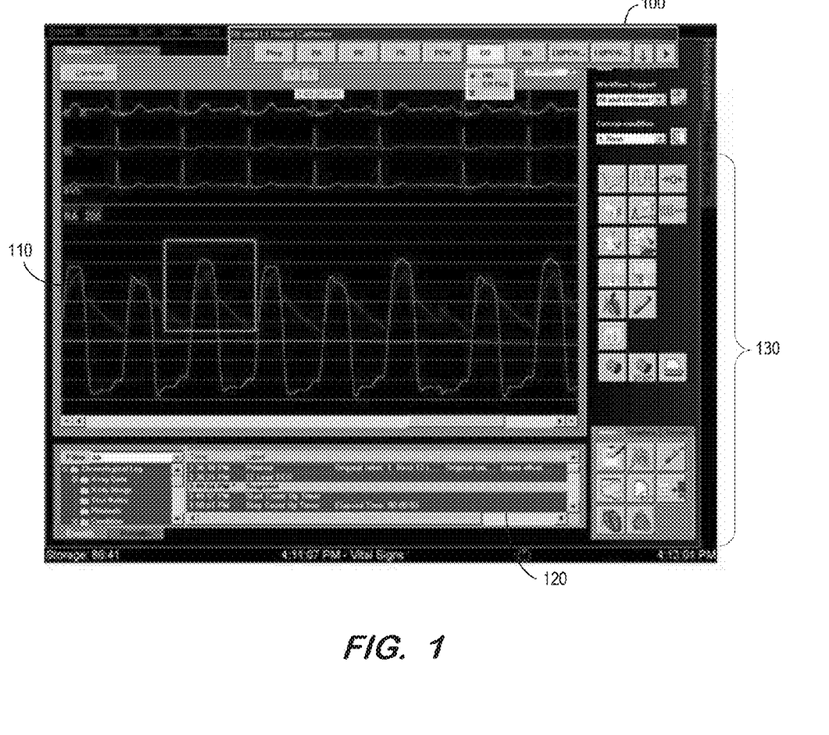
FIG. 1 illustrates an image of an EP video signal.

Conventional medical imaging systems capture Electro-Physiological (EP) signals and display the EP signals on system monitors. FIG. 1 includes image 100 of a displayed EP signal. Image 100 includes waveform region 110, information area 120 and control buttons 130. Image 100 is generated based on a received digital video signal and is made up of image pixels. Each image pixel is associated with a color value (e.g., an 8-bit value for each of Red, Green and Blue components).

To ensure conformance between image 100 and the monitor on which it will be displayed, the received digital video signal is scaled prior to display of image 100. Scaling (e.g., using a bi-cubic scaling algorithm) reduces the brightness of the EP signals within waveform region 110 because the scaling operation incorporates adjacent dark pixels into the computation of the scaled waveform pixels. More specifically, the brightness of the waveform pixels is reduced because the black background of waveform region 110 is provided weight in the computation of the scaled waveform pixels.

Accordingly, conventional systems for scaling EP signals result in dark and difficult-to-see signals. Enhancement functions are known, but such functions produce distortion within the non-waveform regions of the resulting image.

BRIEF DESCRIPTION OF THE DRAWINGS

The patent or application filed contains at least one drawing executed in color. Copies of this patent or patent application publication with color drawing(s) will be provided by the Office upon request and payment of the necessary fee.

The construction and usage of embodiments will become readily apparent from consideration of the following specification as illustrated in the accompanying drawings, in which like reference numerals designate like parts, and wherein.

DETAILED DESCRIPTION

The following description is provided to enable any person in the art to make and use the described embodiments and sets forth the best mode contemplated for carrying out the described embodiments. Various modifications, however, will remain readily apparent to those in the art.

Figure 2:
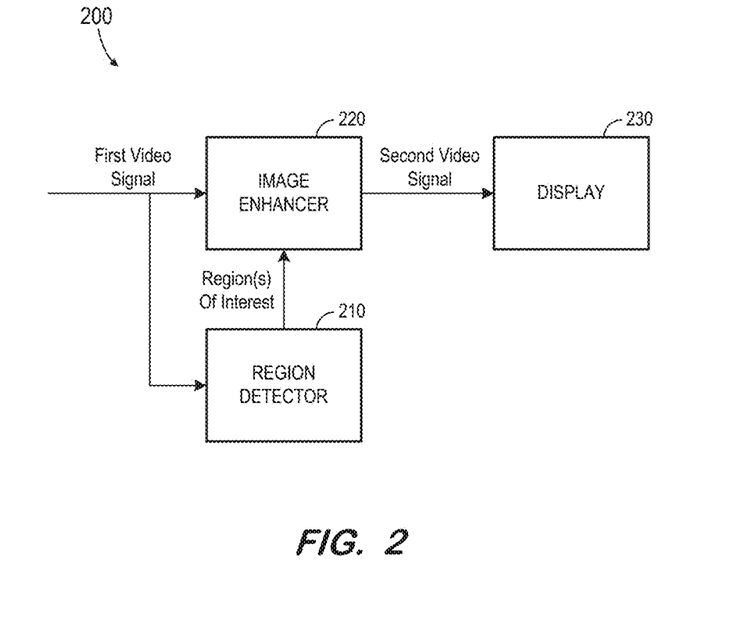
FIG. 2 is a block diagram of a system according to some embodiments.

FIG. 2 illustrates system 200 according to some embodiments. System 200 may comprise elements of an image processing unit, other elements of which are omitted from FIG. 2 for clarity. System 200 may be implemented within an angiography imaging system for displaying angiographic signals and data, or within any other type of imaging system for displaying any other type of images that is or becomes known. The elements of system 200 may be implemented using any combination of hardware and/or software, and may be physically located in one or more separate physical units.

Generally, system 200 receives a first video signal comprised of first image pixels, generates a second video signal comprised of second image pixels, and displays the second video signal. The first video signal may be a scaled version of another video signal, but embodiments are not limited thereto.

More particularly, region detector 210 determines one or more regions of interest within the first video signal. These regions may be those regions which include thin colored lines (e.g., waveforms) on a black background. Image enhancer 220 identifies pixels of the first video signal which lie within the regions of interest and enhances those pixels as will be described below. The second video signal, which includes the enhanced pixels as well as non-enhanced pixels of the first video signal, is then displayed by display 230.

Figure 3:
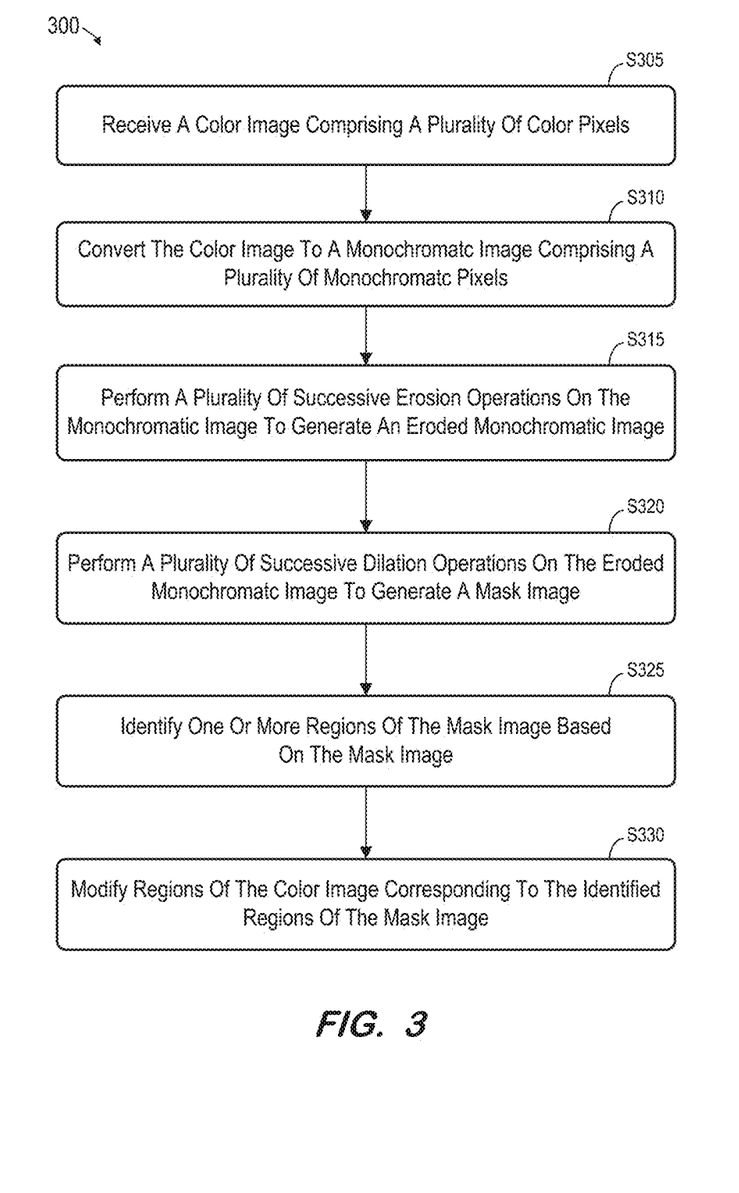
FIG. 3 is a flow diagram of a process to determine regions of interest according to some embodiments.

FIG. 3 is a flow diagram of process 300 according to some embodiments. Process 300 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape. For example, any element of FIG. 2 may comprise one or more processors executing software program code to cause performance of process 300.

Initially, a color image including a plurality of color pixels is received at S305. According to some embodiments, the color image is embodied within a color video signal. The color image may include a color waveform on a black background, along with variously-colored user interface elements (e.g., buttons, sliders, etc.) and text information. As described above, the color image may comprise a user interface for displaying EP signals. Moreover, as also described above, the color image may comprise a scaled color image. Embodiments are not limited to any particular type of color image, or to a scaled color image.

Next, at S310, the color image is converted to a monochromatic image which includes a plurality of monochromatic pixels. Any system for conversion to monochrome may be employed at S310. In one example, all pixels having an intensity value less than a threshold are converted to black pixels, and all pixels having an intensity value greater than or equal to the threshold are converted to white pixels.

It will be assumed, for purposes of example, that color image 100 is received by region detector 210 at S305. Region detector 210 may then convert each color pixel of color image 100 to one of two colors at S310. According to some embodiments, the two colors are black and white. To save memory, each of these colors may be represented by a 1-bit value. Therefore, in some embodiments of S310, a monochromatic image is created in which each pixel is represented by '0' or '1'.

A plurality of successive erosion operations are performed on the monochromatic image at S315 to generate an eroded monochromatic image. Generally, an erosion operation may thin image objects and remove narrow objects from an image. According to some embodiments of the erosion operation, the value of each monochromatic pixel is set to the minimum value of all pixels in its neighborhood. Therefore, a given pixel is set to '0' if any pixel in its neighborhood has a value of '0'. The "neighborhood" may be defined to only include immediately-adjacent (i.e., "touching" pixels), or otherwise defined by a user.

After performing the erosion operation once, the erosion operation is performed again on the resulting eroded image. This process may be repeated several more times, with the number of iterations being user-defined.

Next, at S320, a plurality of successive dilation operations are performed on the eroded monochromatic image to generate a mask image. The dilation operation may comprise an operation which builds up image objects. According to some embodiments of the dilation operation, the value of each monochromatic pixel is set to the maximum value of all pixels in its neighborhood. Therefore, a given pixel is set to '1' if any pixel in its neighborhood has a value of '1'. The "neighborhood" may be user-defined, and the definition may differ from the definition used in the erosion operation.

After performing the dilation operation once, the operation is performed again on the resulting dilated image. This process may be repeated several more times, with the number of iterations being user-defined. According to some embodiments, the number of dilation operations performed at S320 is equal to the number of erosion operations performed at S315. In some embodiments, only one erosion operation is performed at S315 and only one dilation operation is performed at S320.

Figure 4:
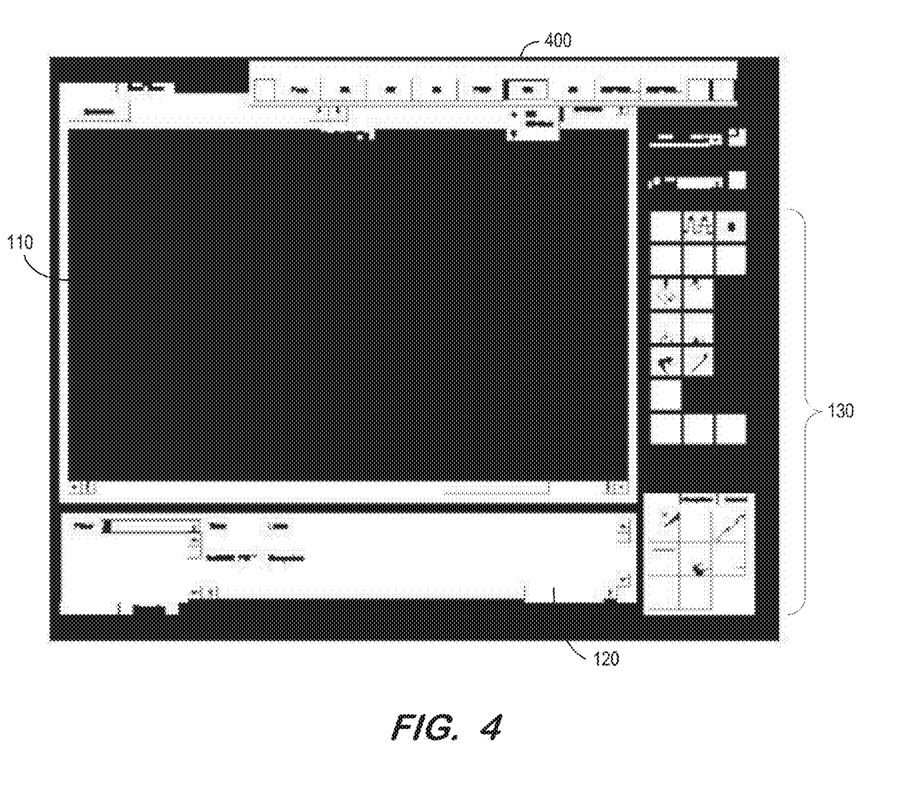
FIG. 4 depicts a mask image according to some embodiments.

The image resulting from S320 is referred to herein as a mask image. FIG. 4 illustrates mask image 400 which, according to some embodiments, is generated at S320 based on color image 100 received at S305. Notably, waveform region 110 is a solid black region, while text within information area 120 and graphic details of control buttons 130 are surrounded by white areas.

One or more regions of the mask image are identified at S325. S325 may comprise performing edge detection on mask image 400 to identify the edges of solid black areas within image 400. S325 may employ any edge detection algorithms that are or become known. Moreover, various thresholds used by such algorithms may be user-defined. According to some embodiments, S325 generates coordinate pairs associated with each detected region of interest. For example, S325 may generate coordinate pairs corresponding to each point along the perimeter of the black area of waveform region 110, as well as coordinate pairs corresponding to the perimeters of the other black regions.

At S330, regions of the color image received at S305 are modified. The modified regions correspond to the identified regions of the mask image. With respect to system 200, image enhancer 220 may modify the pixels of the first video signal at S330 based on information regarding the regions of interest received from region detector 210. Embodiments may implement any process for image modification at S330.

Figure 5:
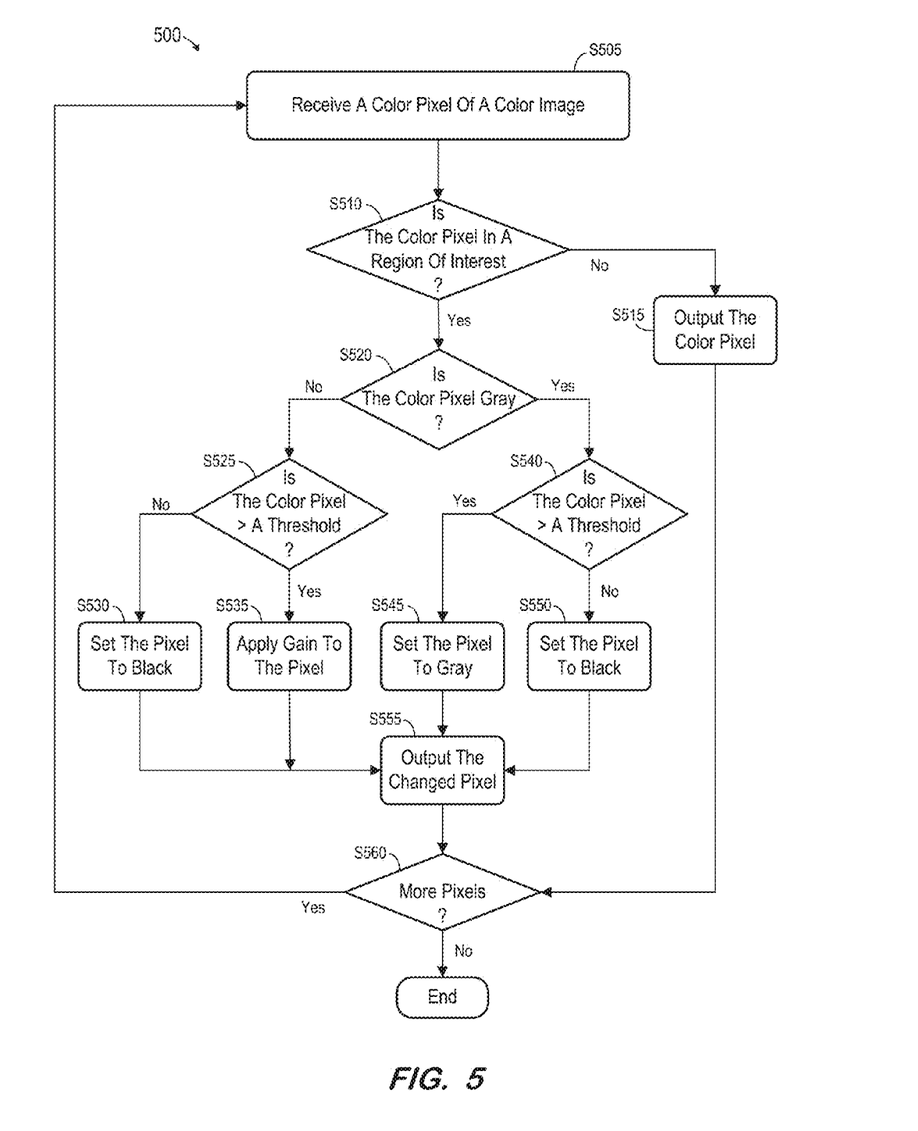
FIG. 5 is a flow diagram of a process to enhance image pixels according to some embodiments.

Process 500 of FIG. 5 is one example of image modification which may be employed at S330 according to some embodiments. Process 500 will be described as if performed by image enhancer 220 of the present example. However, processes 300 and 500 are mutually-exclusive in that systems may employ one without the other.

A color pixel of a color image is received at S505, and, at S510, it is determined whether the color pixel is in a region of interest. The determination at S510 depends upon the manner in which the region of interest is defined. Using the example described above, S510 may comprise determining whether the coordinates of the color pixel lie within the perimeter of an identified region of interest, as defined by coordinate pairs provided by region detector 210.

In a more particular example, the received color pixel may be associated with a particular row of the color image. Region detector 210 may provide the coordinate pairs of the edges of each region of interest lying in that particular row. Accordingly, S510 simply comprises a determination of whether the X (i.e., column)-coordinate of the color pixel lies within the X-coordinates of the edges of any region of interest in that row.

If it is determined that the color pixel is not in a region of interest, the color pixel is output to the modified image, unchanged, at S515. Therefore, the corresponding pixel of the final modified image will be identical to the color pixel of the original color image.

On the other hand, flow proceeds from S515 to S520 if the color pixel is determined to lie within a region of interest. At S520 it is determined whether the pixel is gray. According to some embodiments, a gray pixel is a pixel which is associated with substantially equal R, G and B values. The identification of gray pixels is intended to identify gray lines of a graticule in the waveform region. Accordingly, the determination at S520 may be tuned to identify a particular range of gray pixels associated with an expected graticule color. This consideration may be ignored in some embodiments, with flow proceeding directly to S525 from S510.

If the color pixel is not determined to be gray, it is determined whether an intensity of the color pixel is greater than a threshold at S525. The threshold may be user-defined, and is intended to delineate between colored waveform pixels and black background pixels. Accordingly, if the intensity is not greater than the threshold, the pixel is set to black at S530. If the intensity is greater than the threshold, a gain is applied to the pixel at S535.

The gain applied at S535 is intended to enhance the visibility of the pixel. According to some embodiments of S535, a gain factor is applied equally to each color component of the pixel and, saturate each color if the resulting color is greater than the brightest value of the color system. Any other algorithm for increasing pixel visibility may be employed at S530.

The changed pixel is output to the modified image at S555. Therefore, the changed pixel replaces the color pixel of the original color image in the final modified image. Flow then proceeds to S560 to determine whether the color image includes more pixels and, if so returns to S505 and continues as described above.

Returning to S520, flow proceeds to S540 if it is determined that the received color pixel is gray. If the intensity of the gray pixel is greater than a threshold, the pixel is set to a predetermined gray color at S545. If not, the pixel is set to black at S550. The threshold employed at S540 may be user-defined and is likely different from the threshold employed at S525. As mentioned above, S540 is intended to distinguish graticule pixels from background pixels.

Flow continues from S545 or S550 to S555 to output the changed pixel to the final modified image. The above process continues until it is determined at S560 that no more pixels remain to be processed, at which point process 500 terminates.

Figure 6:
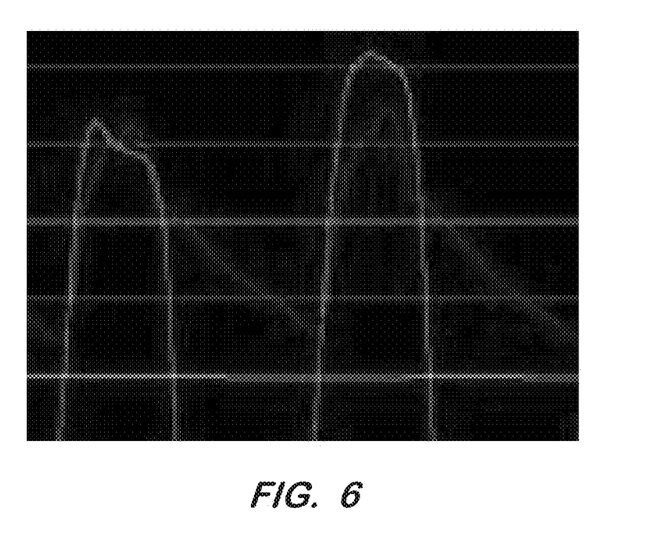
FIG. 6 is an image of a waveform region.
Figure 7:
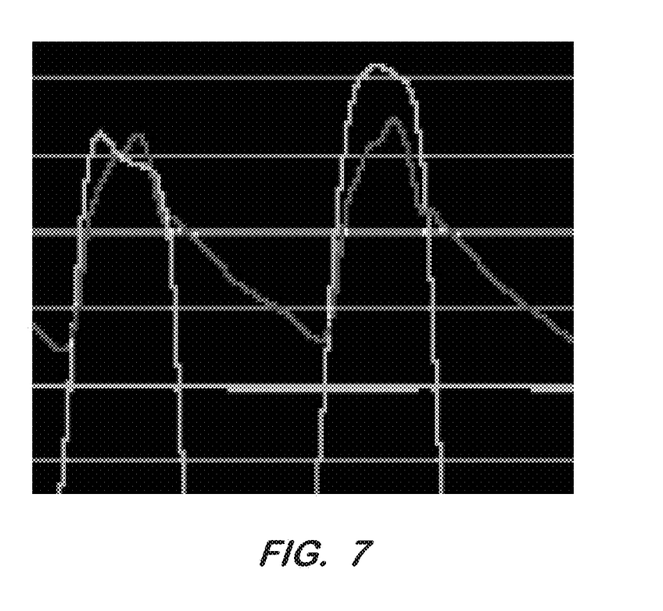
FIG. 7 is an image of an enhanced waveform region according to some embodiments.

FIG. 6 illustrates a portion of a color image which may be processed according to process 500. As shown, the waveform lines are rather faint. FIG. 7 illustrates the FIG. 6 image after it has been modified image according to some embodiments of process 500. The waveform lines, as well as the graticule lines, of the FIG. 7 image are substantially more visible than the corresponding lines of FIG. 6.

Figure 8:
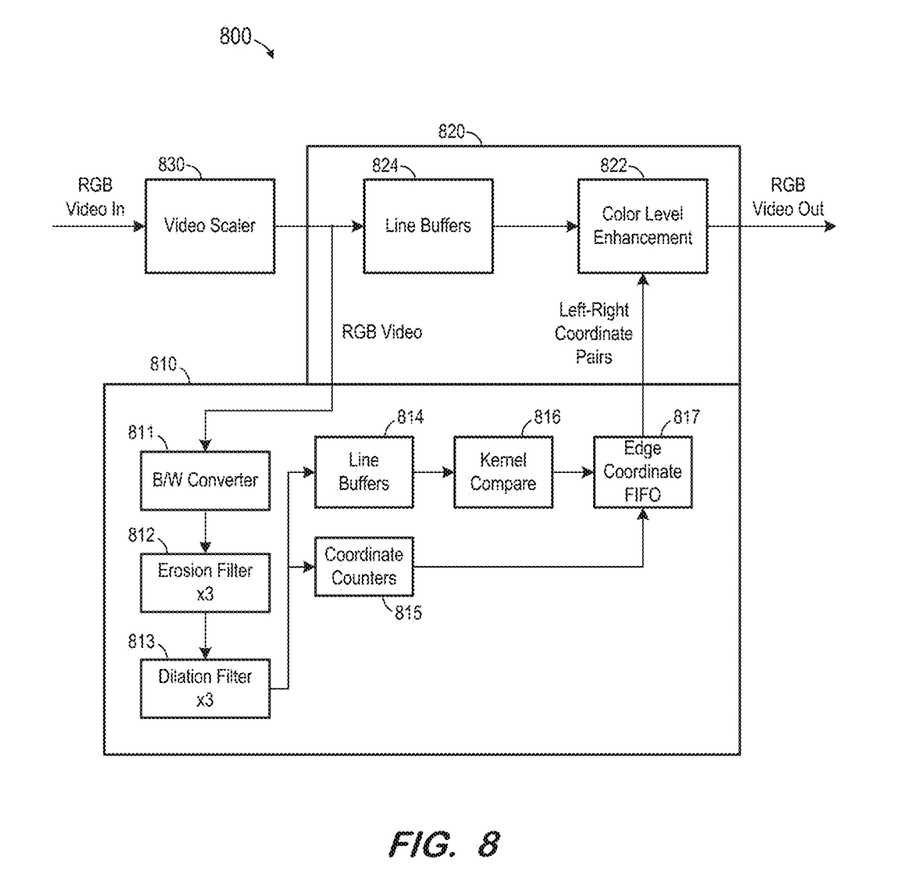
FIG. 8 is a functional block diagram of an implementation according to some embodiments.

FIG. 8 is a detailed block diagram of system 800 according to some embodiments. System 800 may comprise an implementation of system 200 of FIG. 2, and may perform one or both of processes 300 and 500 in some embodiments.

System 800 includes region detector 810, image enhancer 820 and video scaler 830. Video scaler 830 receives a video signal, scales the signal, and provides the scaled signal to region detector 810 and to image enhancer 820. Region detector 810 uses B/W converter 811 to convert the image to monochrome, and filters 812 and 813 to perform three successive erosion operations and dilation operations, respectively, on the monochromatic image.

Line buffers 814, coordinate counters 815 and kernel compare element 816 are used to determine edges within the monochromatic image, on a line-by-line basis. Coordinate pairs of these edges are pushed from FIFO 817 to color level enhancement module 822 of image enhancer 820.

Color level enhancement module 822 also operates on a line-by-line basis, in conjunction with line buffers 824. As described with respect to process 500, color level enhancement module 822 may receive a color pixel of a given row from line buffers 824, determine that the color pixel lies within a region of interest based on the coordinate pairs received from FIFO 817, and perform image enhancement on the color pixel.

Figure 9:
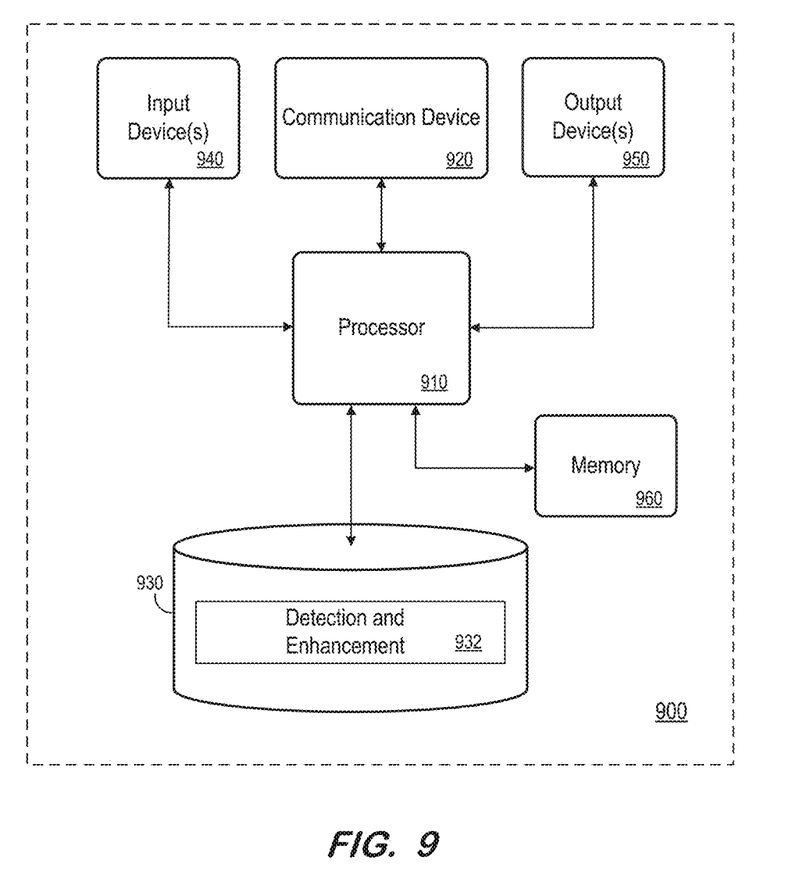
FIG. 9 is a block diagram of a system according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of system 200 and/or system 800 according to some embodiments. Apparatus 900 may include other unshown elements.

Apparatus 900 includes processor 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) such as display 230, a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Detection and enhancement module 932 may comprise program code executed by processor 910 to cause apparatus 900 to perform any one or more of the processes described herein. Embodiments are not limited to execution of these processes by a single apparatus. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A system comprising:
    an imaging processing unit for processing digital data representing an image comprising a patient electro-physiological waveform, wherein the imaging processing unit is configured to:
        receive the image comprising a plurality of pixels;
        locate one or more regions of interest within the image;
        enhance the pixels in the one or more regions of interest to improve visibility of the pixels; and
        modify the image to include the enhanced pixels and non-enhanced pixels in the image; and
    a display to display the modified image comprising the patient electro-physiological waveform with the enhanced pixels.

2. The system according to claim 1, wherein the image is embodied in a first video signal when received by the imaging processing unit and the modified image is embodied in a second video signal generated by the image processing unit for transmission to the display.

3. The system according to claim 1, wherein one or more of the pixels in the received image is color and wherein the image data processor enhances the pixels in the one or more regions of interest with a color enhancement operation.

4. The system according to claim 1, wherein the image further comprises at least one of a user interface element and a text information element.

5. The system according to claim 1, wherein the received image is a scaled version of another image and wherein the imaging processing unit is further configured to downscale the image.

6. The system according to claim 1, wherein the imaging processing unit is further configured to apply erosion and dilation operations on the image prior to location of the one or more regions of interest.

7. The system according to claim 6, wherein the application of erosion and dilation operations by the imaging processing unit generates a mask image and wherein the imaging processing unit is further configured to perform edge detection on the mask image.

8. The system according to claim 7, wherein the image processing unit is further configured to identify coordinate pairs defining edges of the one or more regions of interest in the mask image.

9. The system according to claim 6, wherein the image processing unit is further configured to convert the image to a monochromatic image including a plurality of monochromatic pixels prior to application of erosion and dilation operations.

10. The system according to claim 9, wherein each of the plurality of monochromatic pixels is associated with a 1-bit value.

11. A method comprising:
receiving an image including a patient electro-physiological waveform, wherein the image comprises a plurality of pixels;
locating one or more regions of interest within the image;
enhancing the pixels in the one or more regions of interest to improve visibility of the pixels;
modifying the image to include the enhanced pixels and non-enhanced pixels in the image; and
displaying the modified image including the patient electro-physiological waveform with the enhanced pixels.

12. The method according to claim 11, further comprising generating a second video signal embodying the modified image for transmission to the display, wherein the image is embodied in a first video signal when received.

13. The method according to claim 11, further comprising enhancing the pixels in the one or more regions of interest with a color enhancement operation, wherein one or more of the pixels in the received image is color.

14. The method according to claim 11, wherein the image further comprises at least one of a user interface element and a text information element.

15. The method according to claim 11, further comprising downscaling the image, wherein the received image is a scaled version of another image.

16. The method according to claim 11, further comprising applying erosion and dilation operations on the image prior to locating the one or more regions of interest.

17. The method according to claim 16, further comprising performing edge detection on a mask image, wherein the application of erosion and dilation operations generates the mask image.

18. The method according to claim 17, further comprising identifying coordinate pairs defining edges of the one or more regions of interest in the mask image.

19. The method according to claim 16, further comprising converting the image to a monochromatic image including a plurality of monochromatic pixels prior to application of erosion and dilation operations.

20. The method according to claim 19, wherein each of the plurality of monochromatic pixels is associated with a 1-bit value.

* * * * *